United States Patent
Hartl et al.

(10) Patent No.: US 10,041,486 B2
(45) Date of Patent: Aug. 7, 2018

(54) CRANK-DRIVEN ARRANGEMENT FOR A PISTON COMPRESSOR

(71) Applicant: KNORR-BREMSE SYSTEME FÜR SCHIENENFAHRZEUGE GMBH, Munich (DE)

(72) Inventors: Michael Hartl, Unterhaching (DE); Stefan Schneider, Munich (DE)

(73) Assignee: KNORR-BREMSE SYSTEME FÜR SCHIENENFAHRZEUGE GMBH, Munich (DE)

( * ) Notice: Subject to any disclaimer, the term of this patent is extended or adjusted under 35 U.S.C. 154(b) by 315 days.

(21) Appl. No.: 14/765,235

(22) PCT Filed: Feb. 11, 2014

(86) PCT No.: PCT/EP2014/052595
§ 371 (c)(1),
(2) Date: Jul. 31, 2015

(87) PCT Pub. No.: WO2014/124917
PCT Pub. Date: Aug. 21, 2014

(65) Prior Publication Data
US 2015/0369232 A1 Dec. 24, 2015

(30) Foreign Application Priority Data

Feb. 14, 2013 (DE) .......... 10 2013 101 498

(51) Int. Cl.
*F16C 7/00* (2006.01)
*F04B 35/01* (2006.01)
(Continued)

(52) U.S. Cl.
CPC .............. *F04B 35/01* (2013.01); *F04B 37/00* (2013.01); *F04B 39/0022* (2013.01);
(Continued)

(58) Field of Classification Search
CPC ...... F04B 35/01; F04B 37/00; F04B 39/0022; F04B 39/02; F04B 39/0094; F04B 53/006; F16C 9/06; F16C 9/04
See application file for complete search history.

(56) References Cited

U.S. PATENT DOCUMENTS 2,155,766 A * 4/1939 Morison ................... F16C 9/06
                                                        384/268
2,652,297 A     9/1953 Stearns et al.
(Continued)

FOREIGN PATENT DOCUMENTS

DE     1013129 B     8/1957
DE     3403671 A1    7/1985
(Continued)

OTHER PUBLICATIONS

Search Report for International Patent Application No. PCT/EP2014/052595; dated Apr. 29, 2014.
(Continued)

*Primary Examiner* — Vicky A Johnson
(74) *Attorney, Agent, or Firm* — Barnes & Thornburg LLP

(57) ABSTRACT

A crank drive arrangement of a piston compressor with a rolling bearing arranged on a crank pin of a crank shaft and to which a connecting rod is attached via an intermediate ring which interacts with apparatus for securing against rotation in relation to the connecting rod, wherein the apparatus for securing against rotation have a pin arrangement fastened in a play-free manner in the connecting rod by a thread and which comes into engagement in an interlocking manner in the intermediate ring via a play-exhibiting fit.

18 Claims, 2 Drawing Sheets

(51) Int. Cl.
*F16C 35/077* (2006.01)
*F16C 9/04* (2006.01)
*F04B 53/00* (2006.01)
*F04B 37/00* (2006.01)
*F04B 39/00* (2006.01)

(52) U.S. Cl.
CPC ........ *F04B 39/0094* (2013.01); *F04B 53/006* (2013.01); *F16C 9/04* (2013.01); *F16C 35/077* (2013.01); *F16C 2226/50* (2013.01); *F16C 2360/42* (2013.01)

(56) References Cited

U.S. PATENT DOCUMENTS

| | | | | |
|---|---|---|---|---|
| 3,358,914 | A | * | 12/1967 | Macmillan .......... F04B 39/0094 417/DIG. 1 |
| 3,443,848 | A | | 5/1969 | Philippot et al. |
| 5,152,677 | A | * | 10/1992 | Bauer ..................... F04B 39/06 417/366 |
| 6,973,868 | B2 | * | 12/2005 | Schneider ............... F04B 25/00 74/605 |
| 8,308,447 | B2 | * | 11/2012 | Hartl ....................... F04B 39/06 417/309 |
| 2008/0044305 | A1 | * | 2/2008 | Hirayama ............. F04C 18/356 418/59 |
| 2009/0217902 | A1 | * | 9/2009 | Hartl ....................... F04B 39/14 123/197.4 |
| 2010/0221128 | A1 | * | 9/2010 | Mellar ................... F04B 39/06 417/410.1 |
| 2012/0192710 | A1 | * | 8/2012 | Moore ................ F04B 39/0094 92/12.2 |

FOREIGN PATENT DOCUMENTS

| | | |
|---|---|---|
| DE | 19918296 A1 | 10/2000 |
| DE | 10150654 C1 | 2/2003 |
| EP | 1314898 A1 | 5/2003 |
| JP | H02-009331 | 1/1990 |
| JP | H05-014573 | 2/1993 |
| SU | 2 011 901 C1 | 4/1991 |

OTHER PUBLICATIONS

Japanese Office Action corresponding to JP 2015-557395, dated Nov. 27, 2017.

Russian Search Report corresponding to RU 20151438906/11, dated Nov. 15, 2017.

* cited by examiner

CRANK-DRIVEN ARRANGEMENT FOR A PISTON COMPRESSOR

PRIORITY CLAIM

This patent application is a U.S. National Phase of International Patent Application No. PCT/EP2014/052595, filed 11 Feb. 2014, which claims priority to German Patent Application No. 10 2013 101 498.4, filed 14 Feb. 2013, the disclosures of which are incorporated herein by reference in their entirety.

FIELD

Disclosed embodiments relate to a crank drive arrangement of a piston compressor, having a rolling bearing which is arranged on a crankpin of a crankshaft and to which a connecting rod is attached by way of an intermediate ring which interacts with means for securing against relative rotation with respect to the connecting rod. Disclosed embodiments also relate to an oil-free compressor unit for generating compressed air, which compressor unit is equipped with a crank drive arrangement of the type.

Disclosed embodiments extend primarily to compressed-air compressors in the rail vehicle engineering sector, which are subjected to harsh requirements during operation, in particular high temperature fluctuations from minus 50° Celsius to plus 50° Celsius. Here, operation is implemented with long running times and long activation periods, such that the compressed-air compressors are often operated at the maximum temperature limit of the components. Furthermore, compressed-air compressors in rail vehicle engineering often have to be accommodated in constricted spaces, which impedes a supply of cooling air. All of these boundary conditions are conducive to considerable thermal expansion of the components, which places a burden in particular on components which are situated in the power flow of the drive and which interact by way of positively locking means for securing against relative rotation.

Disclosed embodiments provide a crank drive arrangement of a piston compressor, of which the means for securing against relative rotation with respect to a connecting rod is of simple and operationally reliable design from a manufacturing aspect.

BRIEF DESCRIPTION OF THE FIGURES

Disclosed embodiments will be presented in more detail below on the basis of the figures, in which.

DETAILED DESCRIPTION OF THE DISCLOSED EMBODIMENTS

Figure 1:
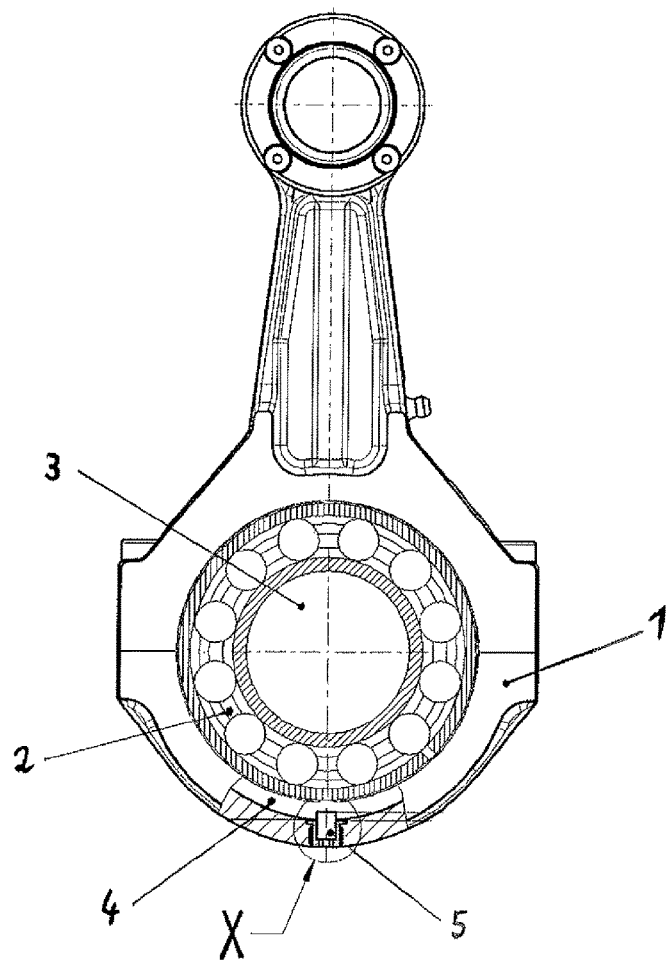
FIG. 1 shows a side view of a connecting rod of a crank drive arrangement, with a partial section in the region of the means for securing against relative rotation.

Disclosed embodiments encompass the technical teaching that the means for securing against relative rotation have a pin arrangement which is fastened in play-free fashion in the connecting rod by means of a thread and which engages in positively locking fashion into the intermediate ring with a clearance fit.

Disclosed embodiments ensure that relatively secure seating can be ensured, by virtue of the fact that the means for securing against relative rotation are fastened in the connecting rod by way of a thread, whereas the clearance fit in interaction with the intermediate ring ensures simple assembly.

In at least one disclosed embodiment, the pin arrangement is of two-part form, and thus comprises a substantially cylindrical pin with a smooth shell surface, which pin is pressed into a bushing which is equipped with an external thread for screwing into the connecting rod. With this two-part design, it is possible for both the threaded fastening with respect to the connecting rod and the positively locking interference fit with respect to the intermediate ring to be implemented in a simple manner from a manufacturing aspect.

To realize a firm connection of the pin arrangement, it is proposed that the cylindrical pin be composed of a hardened and tempered tempering steel, whereas the bushing is composed of a relatively soft pre-tempered steel material. In at least one disclosed embodiment, the pin should have a hardness of at least 45 HRC (Rockwell), and the bushing should have a hardness of at most 45 HRC.

It is also proposed that the pin arrangement which is screwed by way of the external thread into the connecting rod additionally be secured by way of a screw securing adhesive. This prevents the possibility of the pin arrangement becoming detached from the connecting rod of its own accord.

To limit the screwing-in depth of the pin arrangement into the connecting rod, it is proposed that the bushing optionally has a radially outer collar which axially adjoins the external thread and which serves to form a stop. The stop is accommodated in a corresponding countersink of a screw passage bore of the connecting rod.

In another disclosed embodiment, the bushing is provided with a radius at the point at which the pin projects out of the bushing. In this way, notch stresses in the pin are reduced, such that, with this measure which is simple from a manufacturing aspect, failure of the pin under the action of high continuous load is prevented.

A further disclosed embodiment which improves the strength of the means for securing against relative rotation consists in that a base bore, which corresponds to the pin of the pin arrangement, in the intermediate ring is surface-hardened, wherein the hardness of the surface corresponds to the hardness of the pin. In this respect, the intermediate ring should be correspondingly hardened at least in the region of the base bore. It is self-evidently also conceivable for the intermediate ring as a whole to be composed of a hardened material, which is of a hardness approximately corresponding to that of the pin.

High stability of the pin arrangement can be ensured optionally by virtue of that part of the pin which is pressed into the bushing being of at least equal length to that part of the pin which projects out of the bushing. An expedient stress distribution within the pin under load can be ensured in this way.

As per FIG. 1, a connecting rod 1 of a crank drive arrangement (not illustrated in detail) of a piston compressor is rotatably mounted by way of a rolling bearing 2 on a crankpin 3 of a crankshaft. The connecting rod 1, which is composed of a light metal, is fastened, by way of an intermediate ring 4 which is produced from a steel material, to the outside of the rolling bearing 2, that is to say to the bearing outer ring, which is likewise produced from a steel material, of the rolling bearing. The intermediate ring 4 interacts with means for securing against relative rotation with respect to the connecting rod 1, which means has a pin arrangement 5 which is fastened in play-free fashion in the connecting rod 1 by means of a thread and which engages in positively locking fashion with a clearance fit into a corresponding receptacle in the intermediate ring 4.

Figure 2:
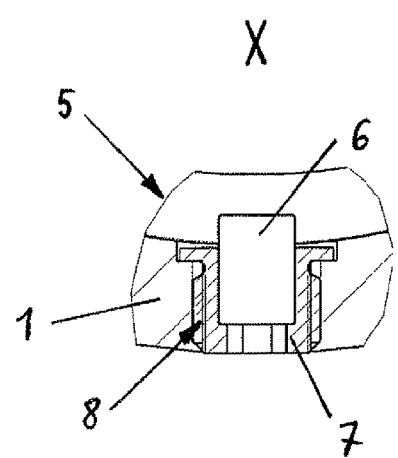
FIG. 2 shows a longitudinal section (detail X) in the region of the means for securing against relative rotation as shown in FIG. 1.

As per the detail X illustrated in FIG. 2 in the region of the means for securing against relative rotation, the pin arrangement 5 is of two-part form. In this regard, a cylindrical pin 6 with a smooth shell surface is pressed into a bushing 7 which is equipped with an external thread 8 for screwing into the connecting rod 1. The bushing 7, which is screwed by way of the external thread 8 into the connecting rod 1, of the pin arrangement 5 is secured by way of a screw securing adhesive.

Figure 3:
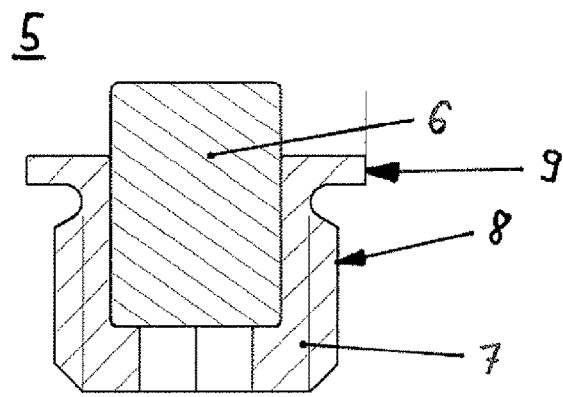
FIG. 3 shows a longitudinal section of a pin arrangement of the means for securing against relative rotation.

As per FIG. 3, the bushing 7 has a radially outer collar 9 which axially adjoins the external thread 8. The collar 9 which is integrally formed on the bushing 7 forms a stop for limiting the screwing-in depth of the bushing 7 into the connecting rod 1 (not illustrated in any more detail). That part of the pin 6 which is pressed into the bushing 7 is, in this exemplary embodiment, longer than that part of the pin 6 which projects out of the bushing 7.

Figure 4:
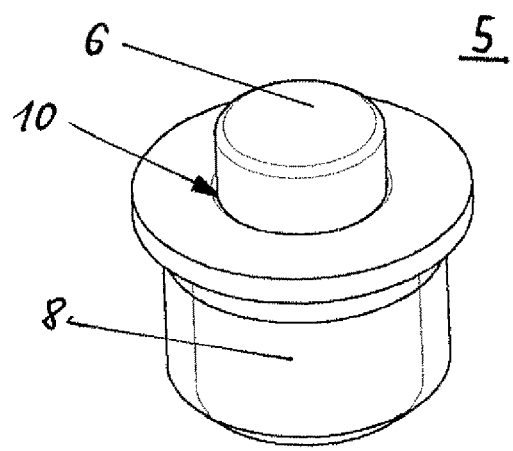
FIG. 4 shows a perspective view of the pin arrangement shown in FIG. 3.

As per FIG. 4, the bushing 7 is provided with a radius 10 at the location at which the pin 6 projects out of the bushing 7, to eliminate notch stresses.

Embodiments are not restricted to the exemplary embodiment described above. Modifications thereto are also conceivable which are also encompassed by the scope of protection of the following claims or which at least appear obvious with regard thereto. For example, it is also possible for the pin arrangement to interact directly with the bearing outer ring of the rolling bearing, which in this case would have to be formed with a base bore at a suitable location.

In practice, it has been found that such high loads act on the means for securing against relative rotation in particular in the event of so-called "pantograph jumps", that is to say discontinuities in the power rail, which have the effect that the rotational speed of the compressed-air compressor briefly falls before subsequently abruptly increasing again. In particular, means for securing against relative rotation in the region of the crank drive of a piston compressor are subjected to intense load in this way.

According to the generally known prior art, connecting rods within a crank drive arrangement of a piston compressor are of split design. The connecting rods are installed in multiple steps, wherein firstly, the crankshaft, with its crankpin bearings pressed thereon, is installed into a crankcase. Subsequently, the connecting rods are introduced through those openings in the crankcase which will later serve for the installation of the cylinders. Each connecting rod and the associated split crankshaft-side half-shell are joined onto the rolling bearings of the crankshaft. Owing to this, a means, which must be provided at this location, for securing against relative rotation between connecting rod and the rolling bearing cannot be designed to be free from play; the means must therefore be joined into the fixing of the rolling bearing of the crankshaft with a degree of play.

In the presence of high temperatures, the aluminum material of the connecting rod loses its interference fit with the rolling bearing and the normally interposed intermediate ring composed of steel, into which the rolling bearing and seals are pressed, owing to the different thermal expansions of the components; this has the result that the positively locking means for securing against relative rotation are subject to load during every compression and expansion of the compressor piston. The pulsating load results in a permanent relative movement in the play of the means for securing against relative rotation, which must be provided in the case of the prior art for assemblability reasons.

EP 1 314 898 A1 has disclosed a crank drive arrangement, in particular for a piston compressor, which crank drive arrangement is composed substantially of a crankshaft with at least one crankpin to which a connecting rod composed of light metal is rotatably fastened by way of at least one rolling bearing, wherein, between the rolling bearing and the connecting rod, there is arranged an intermediate ring which, at one side, is connected rotationally conjointly by way of an interference fit to the rolling bearing and which, at the other side, is connected rotationally conjointly in positively locking fashion to the connecting rod. The intermediate ring is composed of a material with at least approximately the same specific coefficient of thermal expansion as the material of the rolling bearing, to prevent loosening of the rolling bearing with respect to the connecting rod in the event of temperature fluctuations. The positively locking connection between rolling bearing and connecting rod is realized in this case by way of a knurled profiling or at least one radially protruding pin. The pin may in this case be a separate component, a constituent part of the connecting rod, or a constituent part of the intermediate ring.

In practice, for manufacturing reasons and operational reasons, it has been found to be advantageous for the means for securing against relative rotation to be designed as a separate pin, as it should, owing to the high loads, be composed of an extremely durable material, whereas the connecting rod is normally produced from a light metal. If the means for securing against relative rotation, which comprises a pin, is produced from steel, the pin must be anchored in the light metal material of the connecting rod. A simple interference fit according to the prior art is however exposed to different thermal expansions of the materials, and therefore tends to loosen, create play, and/or exhibit deflection. A deflected pin of a means for securing against relative rotation can lead to considerable bearing damage.

LIST OF REFERENCE SIGNS

1 Connecting rod
2 Rolling bearing
3 Crankpin
4 Intermediate ring
5 Pin arrangement
6 Pin
7 Bushing
8 External thread
9 Collar
10 Radius
X Detail

The invention claimed is:

1. A crank drive arrangement of a piston compressor, the crank drive arrangement comprising:
   a rolling bearing arranged on a crankpin of a crankshaft and to which a connecting rod is attached by way of an intermediate ring; and
   a means for securing against relative rotation with respect to the connecting rod which interacts with the intermediate ring,
   wherein the means for securing against relative rotation includes a pin arrangement fastened in in the connecting rod by a thread, wherein the pin arrangement engages into the intermediate ring, to positively lock into the intermediate ring with a clearance fit.

2. The crank drive arrangement of claim 1, wherein the pin arrangement is comprised of two parts including a cylindrical pin for insertion into a bushing equipped with an external thread for screwing into the connecting rod.

3. The crank drive arrangement of claim 2, wherein the cylindrical pin is composed of a hardened and tempered tempering steel, whereas the bushing is composed of less hardened, pre-tempered steel material.

4. The crank drive arrangement of claim 2, wherein the pin arrangement is screwed, by way of the external thread, into the connecting rod and the pin is secured by way of a screw securing adhesive.

5. The crank drive arrangement of claim 2, wherein the bushing is provided with a radius at the point at which the pin projects out of the bushing.

6. The crank drive arrangement of claim 2, wherein that part of the pin which is pressed into the bushing is of at least equal length to that part of the pin which projects out of the bushing.

7. The crank drive arrangement of claim 2, wherein a portion of the intermediate ring is surface-hardened, that portion corresponding to the pin of the pin arrangement, wherein the hardness of the surface corresponds to the hardness of the pin.

8. The crank drive arrangement of claim 7, wherein the intermediate ring is composed of a steel material.

9. The crank drive arrangement of claim 1, further comprising a bushing having a radially outer collar which axially adjoins the external thread and which forms a stop for limiting a screwing-in depth into the connecting rod.

10. A crank drive arrangement of a piston compressor, the crank drive arrangement comprising:
   a rolling bearing arranged on a crankpin of a crankshaft;
   an intermediate ring;
   a connecting rod attached to the rolling bearing by the intermediate ring; and
   a pin arrangement that secures against relative rotation with respect to the connecting rod's interaction with the intermediate ring,
   wherein pin arrangement is fastened to the connecting rod by a thread and the pin arrangement engages into the intermediate ring, to positively lock into the intermediate ring with a clearance fit.

11. The crank drive arrangement of claim 10, wherein the pin arrangement is comprised of two parts including a cylindrical pin for insertion into a bushing equipped with an external thread for screwing into the connecting rod.

12. The crank drive arrangement of claim 11, wherein the cylindrical pin is composed of a hardened and tempered tempering steel, whereas the bushing is composed of less hardened, pre-tempered steel material.

13. The crank drive arrangement of claim 11, wherein the pin arrangement is screwed, by way of the external thread, into the connecting rod and the pin is secured by way of a screw securing adhesive.

14. The crank drive arrangement of claim 11, wherein the bushing is provided with a radius at the point at which the pin projects out of the bushing.

15. The crank drive arrangement of claim 11, wherein that part of the pin which is pressed into the bushing is of at least equal length to that part of the pin which projects out of the bushing.

16. The crank drive arrangement of claim 11, wherein a portion of the intermediate ring is surface-hardened, that portion corresponding to the pin of the pin arrangement, wherein the hardness of the surface corresponds to the hardness of the pin.

17. The crank drive arrangement of claim 16, wherein the intermediate ring is composed of a steel material.

18. The crank drive arrangement of claim 10, further comprising a bushing having a radially outer collar which axially adjoins the external thread and which forms a stop for limiting a screwing-in depth into the connecting rod.

* * * * *